US012699422B2

(12) United States Patent
Albertson, Jr.

(10) Patent No.: US 12,699,422 B2
(45) Date of Patent: Aug. 4, 2026

(54) LAPTOP COMPUTER WITH FOLDING AUXILLARY SCREENS

(71) Applicant: William Albertson, Jr., Cream Ridge, NJ (US)

(72) Inventor: William Albertson, Jr., Cream Ridge, NJ (US)

( * ) Notice: Subject to any disclaimer, the term of this patent is extended or adjusted under 35 U.S.C. 154(b) by 120 days.

(21) Appl. No.: 18/626,898

(22) Filed: Apr. 4, 2024

(65) Prior Publication Data

US 2025/0315085 A1 Oct. 9, 2025

(51) Int. Cl.
 G06F 1/16 (2006.01)

(52) U.S. Cl.
 CPC .......... G06F 1/1649 (2013.01); G06F 1/1618 (2013.01); G06F 1/1681 (2013.01)

(58) Field of Classification Search
 CPC ..... G06F 1/1649; G06F 1/1618; G06F 1/1681
 See application file for complete search history.

(56) References Cited

U.S. PATENT DOCUMENTS

| | | | | | |
|---|---|---|---|---|---|
| D397,998 | S | * | 9/1998 | Ambroe | D14/373 |
| 6,088,220 | A | * | 7/2000 | Katz | G06F 1/1641 |
| | | | | | 400/82 |
| 6,151,401 | A | * | 11/2000 | Annaratone | G06F 1/1616 |
| | | | | | 381/388 |
| 6,532,146 | B1 | * | 3/2003 | Duquette | G06F 1/1607 |
| | | | | | 361/679.04 |
| 6,643,124 | B1 | * | 11/2003 | Wilk | H04M 1/0247 |
| | | | | | 345/169 |
| 6,667,877 | B2 | * | 12/2003 | Duquette | G06F 1/1677 |
| | | | | | 361/679.04 |
| 6,667,878 | B2 | * | 12/2003 | Ponx | G06F 1/1679 |
| | | | | | 361/679.04 |
| 6,859,219 | B1 | * | 2/2005 | Sall | G06F 1/1683 |
| | | | | | 345/905 |
| 7,136,282 | B1 | * | 11/2006 | Rebeske | G06F 1/1654 |
| | | | | | 361/679.55 |
| 7,446,757 | B2 | * | 11/2008 | Mochizuki | G06F 1/1641 |
| | | | | | 345/905 |
| 7,633,744 | B2 | * | 12/2009 | Kuhn | G06F 1/1622 |
| | | | | | 361/679.04 |
| 8,539,705 | B2 | * | 9/2013 | Bullister | G06F 1/1615 |
| | | | | | 361/679.04 |
| 8,803,816 | B2 | * | 8/2014 | Kilpatrick | G06F 1/1654 |
| | | | | | 345/173 |

(Continued)

*Primary Examiner* — Benyam Ketema
(74) *Attorney, Agent, or Firm* — Sam Pierce

(57) ABSTRACT

The present invention provides a laptop computer with three display screens which can be easily deployed. According to an aspect of the present invention disclosed herein, there is provided a laptop computer, comprising: a keyboard; a processor and a computer memory device housed beneath the keyboard; a first display screen configured to fold over the keyboard by a first pair of hinges; a second pair of hinges connecting the first display screen and keyboard to a second display screen and a third display screen; and a third pair of hinges connecting the second display screen and the third display screen, wherein: the second display screen is configured to fold over the third display screen; and once folded together the second display screen and third display screen are configured to fold over the keyboard and first display screen.

8 Claims, 3 Drawing Sheets

(56)  References Cited

U.S. PATENT DOCUMENTS

| | | | | |
|---|---|---|---|---|
| 8,854,278 | B2 * | 10/2014 | Parker | G06F 1/1647 |
| | | | | 348/794 |
| 10,296,211 | B2 * | 5/2019 | Chen | G06F 1/1662 |
| 10,871,801 | B2 * | 12/2020 | Yao | G06F 1/3234 |
| 11,263,932 | B2 * | 3/2022 | Ko | G09F 1/04 |
| D962,221 | S * | 8/2022 | Leung | D14/315 |
| D962,222 | S * | 8/2022 | Leung | D14/315 |
| 11,416,024 | B2 * | 8/2022 | Bryant | G06F 1/1632 |
| 11,805,311 | B2 * | 10/2023 | Sugaya | H04N 23/531 |
| 11,815,953 | B2 * | 11/2023 | Yao | G06F 1/1649 |
| D1,035,645 | S * | 7/2024 | Lee | D14/315 |
| 12,287,672 | B1 * | 4/2025 | Yu | G06F 1/1647 |
| 2003/0133515 | A1 * | 7/2003 | Kondo | H04N 21/234327 |
| | | | | 375/E7.181 |
| 2003/0218577 | A1 * | 11/2003 | Wang | G06F 1/1671 |
| | | | | 345/1.3 |
| 2004/0042163 | A1 * | 3/2004 | Tutikawa | G06F 1/1656 |
| | | | | 361/679.04 |
| 2005/0099361 | A1 * | 5/2005 | Majer | G06F 3/1423 |
| | | | | 345/1.3 |
| 2005/0134524 | A1 * | 6/2005 | Parker | G06F 1/1641 |
| | | | | 345/1.1 |
| 2007/0279315 | A1 * | 12/2007 | Laves | H04M 1/0268 |
| | | | | 345/1.1 |
| 2008/0068288 | A1 * | 3/2008 | Henkel | G06F 1/1618 |
| | | | | 345/1.3 |
| 2010/0041439 | A1 * | 2/2010 | Bullister | G06F 1/165 |
| | | | | 455/566 |
| 2010/0064244 | A1 * | 3/2010 | Kilpatrick | H04M 1/0243 |
| | | | | 345/1.3 |
| 2011/0115713 | A1 * | 5/2011 | Altman | H04M 1/0247 |
| | | | | 345/169 |
| 2012/0038570 | A1 * | 2/2012 | Delaporte | G06F 1/1643 |
| | | | | 345/173 |
| 2012/0256929 | A1 * | 10/2012 | Koenig | G09G 5/00 |
| | | | | 345/503 |
| 2012/0274565 | A1 * | 11/2012 | Moser | G06F 1/1649 |
| | | | | 345/1.3 |
| 2014/0009404 | A1 * | 1/2014 | Pan | G06F 1/1692 |
| | | | | 345/173 |
| 2014/0285992 | A1 * | 9/2014 | Yang | G06F 1/1641 |
| | | | | 29/592.1 |
| 2014/0375530 | A1 * | 12/2014 | Delaporte | G06F 1/1652 |
| | | | | 345/1.3 |
| 2018/0210504 | A1 * | 7/2018 | Moser | G06F 1/1679 |
| 2019/0243423 | A1 * | 8/2019 | Delaporte | G06F 1/1641 |
| 2020/0117240 | A1 * | 4/2020 | Delaporte | G06F 1/1679 |
| 2020/0341515 | A1 * | 10/2020 | Moser | G06F 1/1692 |
| 2021/0080999 | A1 * | 3/2021 | Bryant | G06F 1/1641 |

* cited by examiner

LAPTOP COMPUTER WITH FOLDING AUXILLARY SCREENS

BACKGROUND

Many computer workstations have multiple screens to enhance productivity. For example, it can be desirable to be able to see a document on one screen, and see a different document or read emails on another screen, and potentially transfer information from one screen to the other. That is currently not efficiently done on a conventional portable computer as current laptops typically have only one screen. Solutions have been disclosed in the prior art patent literature.

For example, US20180210504 discloses portable computer display unit interconnects with a base unit in a clamshell configuration. The display unit contains a first display panel. The base unit contains a second display panel. An angle adjustment mechanism may be provided to adjust the angle of the second display panel relative to a user's view, such as a hinge structure connecting a leading edge of the second display panel to the base unit. A second angle adjustment mechanism may operate to adjust the angle of the base unit relative to a surface on which the second angle adjustment mechanism rests. The display unit may further include a height adjustment mechanism. The height adjustment mechanism, first angle adjustment mechanism and second angle adjustment mechanism may be employed to optimize angles of view for both the first and second display screens, while preventing or minimizing visual occlusion of the first display panel by the second display panel.

U.S. Pat. No. 10,936,015 discloses an electronic device with multiple screens includes a first body, a second body, a keyboard, and at least one expansion module. The first body has a sliding rail assembly, a first end and a second end. The second body is rotatably connected to the first end of the first body. The sliding base is slidably connected to the sliding rail assembly of the first body. The lifting base is pivotally connected to one side of the keyboard facing the first end and is slidably connected to the sliding rail assembly. The at least one expansion module is detachably connected to the lifting base and is disposed between the second body and the keyboard. When the keyboard slides toward the second body, the sliding base is driven to move along the sliding rail assembly and away from the second end of the first body.

Nevertheless, prior art designs are limited at least in versatility, ease of use and convenience.

SUMMARY OF INVENTION

Therefore, the present invention provides a laptop computer with three display screens which can be easily deployed.

According to an aspect of the present invention disclosed herein, there is provided a laptop computer, comprising: a keyboard; a processor and a computer memory device housed beneath the keyboard; a first display screen configured to fold over the keyboard by a first pair of hinges; a second pair of hinges connecting the first display screen and keyboard to a second display screen and a third display screen; and a third pair of hinges connecting the second display screen and the third display screen, wherein: the second display screen is configured to fold over the third display screen; and once folded together the second display screen and third display screen are configured to fold over the keyboard and first display screen.

DETAILED DESCRIPTION

Embodiments of the present invention will be described with reference to the following drawings.

Figure 1:
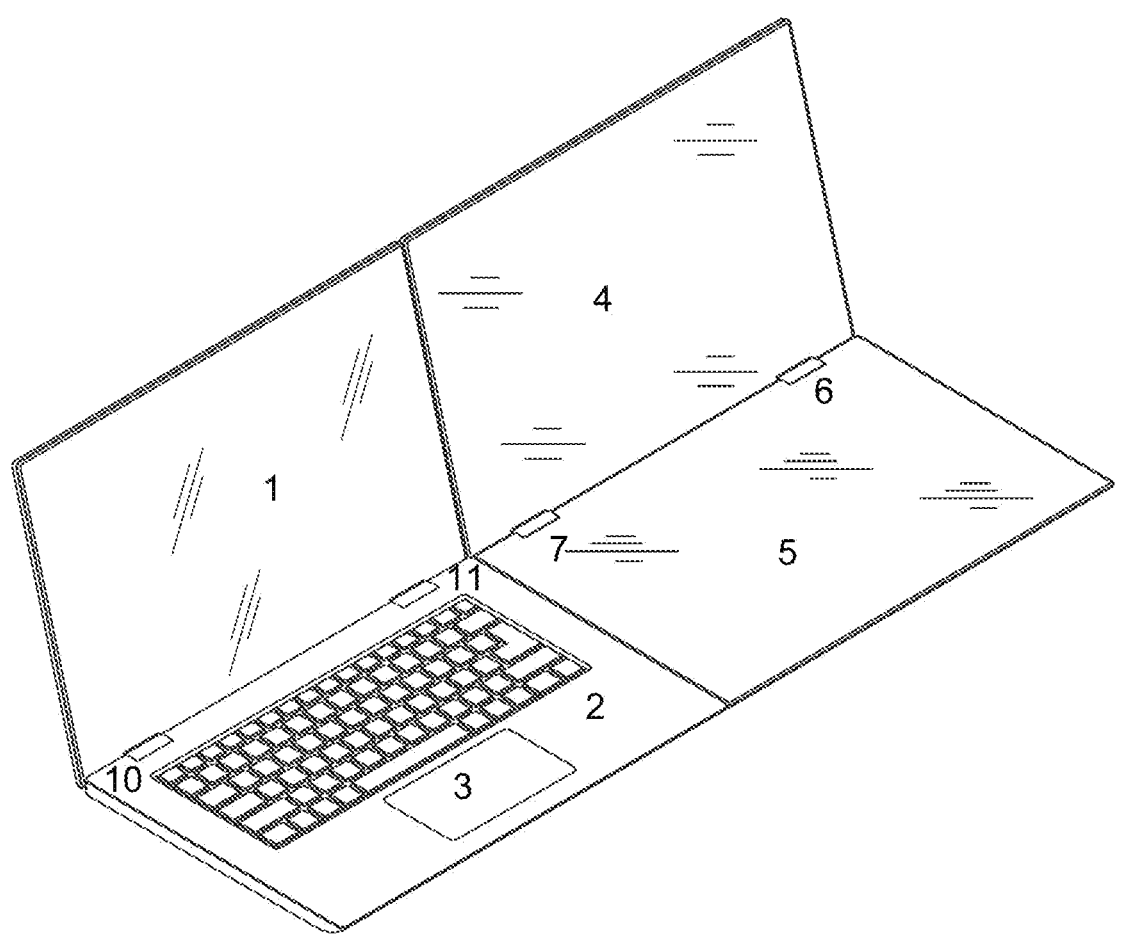
FIG. 1 is an illustration of the laptop computer of the present invention in a completely unfolded configuration.

FIG. 1 is an illustration of the laptop computer of the present invention in a completely unfolded configuration.

The laptop computer has a keyboard 2 and a processor and a computer memory device housed beneath the keyboard. Mousepad 3 is provided with the keyboard 2. The first display screen 1 is a typical laptop display screen configured to fold over the keyboard by a first pair of hinges 10 and 11.

The second display screen 4 is configured to fold over the third display screen 5. A third pair of hinges 6 and 7 connects the second display screen and the third display screen.

Once folded together the second display screen and third display screen are configured to fold over the keyboard and first display screen by a second pair of hinges not visible in FIG. 1 which connects the first display screen and keyboard to the second display screen and the third display screen.

Figure 2:
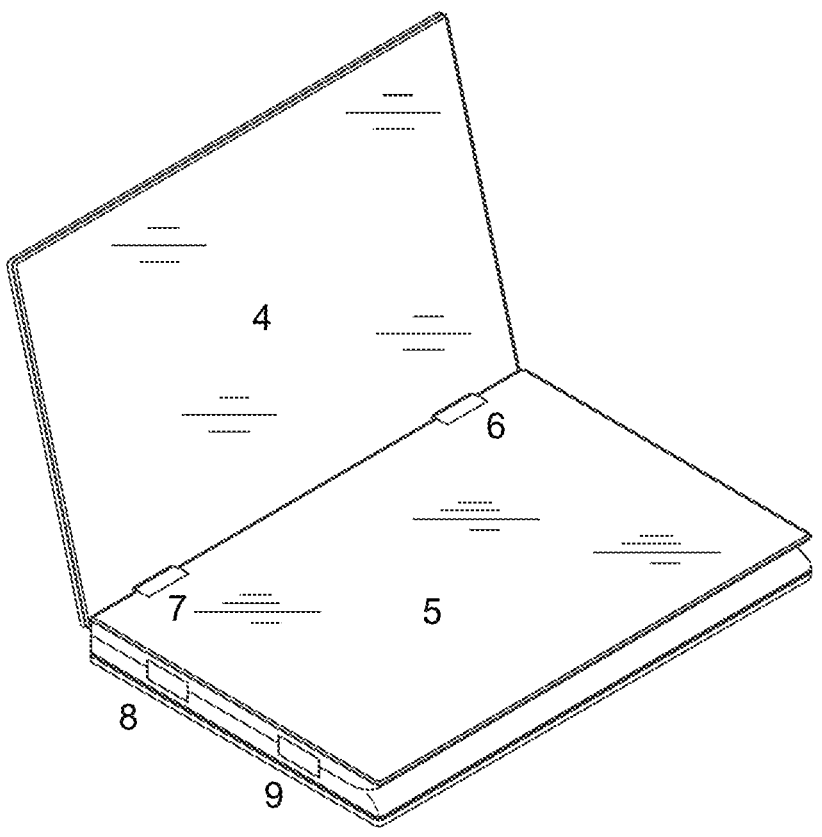
FIG. 2 is an illustration of the laptop computer of the present invention in partially unfolded configuration.

FIG. 2 is an illustration of the laptop computer of the present invention in partially unfolded configuration.

In FIG. 2, the second pair of hinges 8 and 9 are visible. In the embodiment shown, the second display screen and the third display screen are connected on the right side of the keyboard and first display screen, but in other embodiments they can be connected on the left side.

Embodiments can include a mechanism to adjust the angle of first display screen and the second display screen with respect to the keyboard and the third display screen. The angle of the screens can be adjusted by the user by pivoting about the hinges which can be provided rigid enough to maintain the selected angle, i.e., the third pair of hinges 6 and 7 connecting the second display screen and the third display screen and the first pair of hinges not visible in FIG. 2.

A connector between the first display screen and a second display screen can be provided to hold the screens in the same plane, i.e., at the selected angle. The connector can be magnetic and can be permanently affixed to the first display screen or can be removeable and affixed when the laptop of the present invention is in a completely unfolded configuration.

Figure 3:
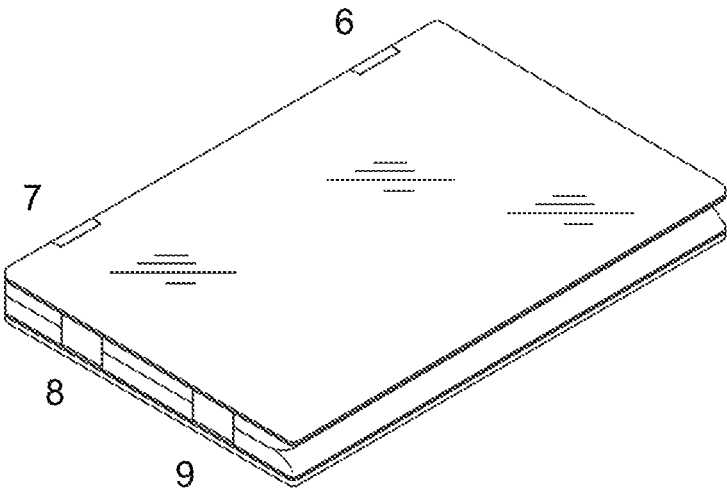
FIG. 3 is an illustration of the laptop computer of the present invention in a completely folded configuration.

FIG. 3 is an illustration of the laptop computer of the present invention in a completely folded configuration.

In FIG. 3, the third pair of hinges 6 and 7 connecting the second display screen to the third display screen, the second pair of hinges 8 and 9 connecting the first display screen and keyboard to the second display screen and the third display screen and the first pair of hinges not visible in FIG. 3 connecting the keyboard above the processor housing and the first display screen are all fully folded.

To connect the second and third display screens to the processor, there can be provided USBC ports in the housing containing the processor. An internal USBC connection can connect the second display screen and the third display screen are connected to the USBC ports.

The internal USBC connection can travel through one of the second pair of hinges and connect to a daughterboard which allows signal to be split to be used for devices in the second and third screen enclosure. This is where the screen signals originate.

In the second and third screen base there can be provided a printed circuit board which splits the USBC signal connected to the laptop signal to an embedded display port to both screens. Embedded DisplayPort (commonly referred to as eDP) is based on the VESA DisplayPort Standard. Embedded DisplayPort is a high performance audio/visual interface developed through the personal computer industry which allows displays to display in 4k and beyond.

In ap referred embodiment, USBC signal only goes through hinges 8 and 9 as hinges 6 and 7 have screen eDP signal.

This board can also allow for its own battery system to also expand on a laptop's battery life.

The illustrations of embodiments described herein are intended to provide a general understanding of the structure of various embodiments, and they are not intended to serve as a complete description of all the elements and features of apparatus and systems that might make use of the structures described herein. Other embodiments may be utilized and derived therefrom, such that structural and logical substitutions and changes may be made without departing from the scope of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

Figures are also merely representational and may not be drawn to scale. Certain proportions thereof may be exaggerated, while others may be minimized. Accordingly, the specification and drawings are to be regarded in an illustrative rather than a restrictive sense.

What is claimed is:

1. A laptop computer, comprising:
a keyboard panel;
a processor and a computer memory device housed beneath the keyboard panel;
a first body having a first display screen configured to fold over the keyboard by a first pair of hinges;
a second body having a second display screen and a third display screen joined a side of the first body;
a second pair of hinges connecting the first display screen and keyboard to a the second display screen and a the third display screen; and
a third pair of hinges connecting the second display screen and the third display screen, wherein angle of the screens can be adjusted by the user by pivoting about the hinges which are provided rigid enough to maintain the selected angle;
wherein:
the third display screen faces in an upward direction towards the sky;
the second display screen is configured to fold over the third display screen;
the second display screen and the third display screen are attached to the first display screen and the keyboard fixed on the right side of the first display screen and the keyboard;
and
the keyboard panel, first display screen, second display screen, and third display screen are identically sized to facilitate folding with flush edges so as to form one continuous surface free of space and running flush from the top of the first, second, and third screen to the base;
once folded together the second display screen and third display screen are configured to fold over the keyboard and first display screen to stack all four;
wherein the second display screen and the third display screen connected by the second hinge enable the second and third display screens to fold face-to-face so that the third hinge connects the first assembly at the keyboard to the second assembly at the lower display to enable the folded second assembly to rotate beneath the keyboard and so that in the closed configuration, the first display rests upon the keyboard, and the face-to-face folded second and third displays are positioned beneath the keyboard, yielding a consolidated portable form factor with all display surfaces protected within the enclosure;
all of the surfaces of the first body, second body, first display screen, second display screen, third display screen are flush against each other in the closed configuration; and
the hinges are configured so that no other folding pattern is possible.

2. The laptop computer of claim 1, further comprising a connector between the first display screen and a second display screen to hold the screens in the same plane.

3. The laptop computer of claim 2, wherein the connector is magnetic.

4. The laptop computer of claim 2, wherein the connector is permanently affixed to the first display screen.

5. The laptop computer of claim 1, further comprising a USBC port in the housing containing the processor.

6. The laptop computer of claim 5, wherein the second display screen and the third display screen are connected through a PCB board in a screen case for the second display screen and the third display screen and each of the second and third display screens gets an eDP signal originating from that PCB board.

7. The laptop computer of claim 6, wherein the internal USBC connection travels through one of the second pair of hinges.

8. The laptop computer of claim 6, wherein the internal USBC connection travels through one of the third pair of hinges.

* * * * *